United States Patent [19]

Daumas et al.

[11] 4,206,147

[45] Jun. 3, 1980

[54] PROCESS FOR THE DEHALOGENATION OF HALOGEN-CONTAINING AROMATIC COMPOUNDS

[75] Inventors: Jean C. Daumas, Orsay; Robert Tarolle, Fresnes; Georges Biola, Bron, all of France

[73] Assignee: Philagro, Lyon, France

[21] Appl. No.: 941,843

[22] Filed: Sep. 12, 1978

[30] Foreign Application Priority Data

Sep. 22, 1977 [FR] France .............................. 77 29399

[51] Int. Cl.$^2$ .................... C07C 85/24; C07C 85/11
[52] U.S. Cl. .................................. 260/578; 252/465;
252/466 J; 260/580
[58] Field of Search ................ 260/578, 580; 252/465,
252/466 J

[56] References Cited

U.S. PATENT DOCUMENTS

| | | | |
|---|---|---|---|
| 3,148,217 | 9/1964 | Freyermuth et al. | 260/580 |
| 3,839,193 | 10/1974 | Hayes | 252/441 X |
| 3,867,312 | 2/1975 | Stephens | 252/462 |
| 3,888,929 | 6/1975 | Rivier | 260/578 |
| 3,912,782 | 10/1975 | Kiel et al. | 260/570.9 X |
| 3,912,783 | 10/1975 | Wedemeyer et al. | 260/570.9 X |
| 4,022,795 | 5/1977 | Bamfield et al. | 260/578 |
| 4,085,141 | 4/1978 | Wedemeyer et al. | 260/578 |
| 4,100,109 | 7/1978 | Muller | 252/465 |

*Primary Examiner*—John Doll
*Attorney, Agent, or Firm*—Browdy and Neimark

[57] ABSTRACT

Process for the dehalogenation of halogen-containing aromatic amines takes place by the action of hydrogen in the presence of a controlled-action hydrogenation catalyst, at a temperature of between 280° and 420° C., the active phase of the catalyst containing, in addition to the main catalyst metal, a minor amount of an auxiliary hydrogen catalyst consisting of a second metal which is different from the first.

18 Claims, No Drawings

PROCESS FOR THE DEHALOGENATION OF HALOGEN-CONTAINING AROMATIC COMPOUNDS

The present invention relates to a process for the manufacture of halogen-containing amino or nitro aromatic compounds by dehalogenating corresponding derivatives which carry a larger number of halogen atoms. It relates more especially to the manufacture of meta-substituted chloroanilines, in particular 3,5-dichloroaniline, from anilines which contain a larger number of chlorine atoms.

BACKGROUND OF THE INVENTION

It is known that 3,5-dichloroaniline can be obtained, according to French Application No. 2,162,782, by a process for the dehalogenation of halogen-containing aromatic compo which leads to the preferential production of derivatives carrying a smaller number of halogen atoms, at least one of which is located in the meta-position relative to a functional group, in the vapour phase, by the action of hydrogen and in the presence of fixed-bed or fluid-bed catalysts, which is characterised in that aromatic amines containing several halogen atoms, are brought into contact with hydrogen at a temperature of between 280° and 420° C., in the presence of a controlled-action hydrogenation catalyst such as a salt (chloride, oxide, nitrate, sulphate or chromite) of copper or of silver.

This process is characterised by its improved selectivity with respect to aromatic derivatives which are substituted in the meta position. However, experiment shows that, in particular when employing as a catalyst copper compounds on an alumina support, it exhibits the major disadvantage that it requires frequent regeneration of the catalyst as a result of the formation in situ of carbon deposits due to the complete degradation of a little part of the starting derivatives.

SUMMARY OF THE INVENTION

It has now been found that these carbon deposits can be considerably reduced by adding to the metal (copper or silver), constituting the active phase of the catalyst, a hydrogenating metal belonging to the group comprising, in particular, palladium, platinum, ruthenium, rhodium and iridium, regardless of the nature of the compound (salt) of these metals which is used to prepare the catalyst.

DESCRIPTION OF THE INVENTION

The invention therefore relates to a process for the dehalogenation of aromatic amines containing two to five halogen atoms, which leads to the preferential production of derivatives carrying a smaller number of halogen atoms, at least one of which is located in the meta position, relative to the amino groups, in the vapour phase, by the action of hydrogen in the presence of a controlled-action hydrogenation catalyst, at a temperature of between 280° and 420° C., characterised in that the active phase of the catalyst contains, in addition to the main catalyst metal, a minor amount of an auxiliary hydrogenation catalyst consisting of another metal which is different from the first.

As hydrogenating metals which can be used as an auxiliary catalyst, there may be mentioned those of group VIII of the periodic table of the elements, preferably those having an atomic number of between 40 and 80, and in particular ruthenium, rhodium, iridium and, more especially, palladium and platinum.

According to the invention, an adequate effect is obtained by using an active phase of the catalyst which in addition to the main catalyst (copper or silver) contains 0.05 to 2% by weight of the auxiliary catalyst, relative to the main catalyst. The amount of metal constituting the active phase of the main catalyst represents 1 to 20% by weight of the whole catalyst.

The catalyst having a modified active phase can be prepared, in a manner which is in itself known, by impregnating an alumina- or silica-based support using a solution of a salt (chloride, sulphate or chromite) or an oxide of each of the metals constituting the active phase of the catalyst.

After impregnation, the catalyst is dried at a temperature of between about 110° and 200° C.

The support which can be used according to the invention is usually in the form of alumina grains or silica grains having a fine particle size, that is to say having a mean diameter ranging from about 60 to 200, and preferably from about 80 to 100 microns, in the case of fluid beds, or having a larger particle size, of the order of a few mm, in the case of fixed beds. The specific surface area of the grains is generally between about 20 and 500 m$^2$/g and is preferably 60 to 320 m$^2$/g.

Advantageously, it is also possible to use an alumina support as described above, which is modified by incorporating a metal either by impregnation using a salt or oxide of an alkali or alkaline earth metal or of a metal such as iron, nickel, cobalt, zinc, copper, chromium, molybdenum or tungsten, or by mixing one of the above metal salts with an aluminium salt, shaping the mixture, gelling it by neutralising the resulting compound and dispersing it as fine spherical droplets in a hot hydrocarbon. This incorporation is followed by a calcination at a temperature ranging from about 500° to 1,000° C. The other general conditions for carrying out the process according to the invention are as follows:

The starting materials are obviously chosen depending on the final products desired, in the sense that an aromatic compound carrying one or two halogen atoms in the meta position is taken if it is desired to preferentially manufacture a product possessing this (these) substituent(s). The presence of at least one halogen atom in the ortho position is necessary if it is intended to manufacture meta- or ortho-substituted amines, although, according to a characteristic of the invention, it is also possible, if desired, to totally omit the ortho-substituents. The choice of the starting material is not subject to any other requirements, that is to say that, taking these prerequisites into account, it is possible to employ derivatives in which the nucleus is either totally or partially substituted by halogen atoms. Moreover, one of the advantages of the process lies in the fact that it makes it possible to utilise certain compounds containing several halogen atoms, in particular chlorine atoms, which do not in themselves have an extensive application; thus, for example, certain isomers of tri- and tetra-chlorobenzenes which are rarely used and have a low cost price, can be converted into tri- and tetra-chloroanilines which make it possible, in accordance with the process of the invention, to obtain a compound such as 3,5-dichloroaniline; the latter is thus manufactured under conditions which are economically much more advantageous than in the case where it is prepared in accordance with the method known hitherto. A further interesting example relates to certain dichloroanilines in which one of the chlorines is in the meta position, for example 3,4-dichloroaniline, and which can be converted into 3-chloroaniline for example. Analogous cases of the utilisation of aromatic compounds containing several bromine atoms can also be found. Finally, it is not necessary for the starting product to be pure; in the process of the invention, it is possible to employ a charge comprising a major proportion of the compound chosen for the reaction, in addition to polyhalogenoamines containing different numbers of halogen atoms, or even by-products. It is also possible to use mixtures of two or more compounds intended for the reaction.

The temperature is a fairly important factor and must be kept within the range from 280° to 420° C., if it is desired to operate in the gas phase of the initial halogen-containing aromatic derivatives and obtain the desired selectivity and a suitable degree of conversion, without the formation of substantial amounts of undesirable products, esecially by degradation and cracking. Within these limits, the temperature range which is more especially suitable is a function of diverse variables. Firstly, silver-based catalysts generally require a relatively high range, of the order of 350° to 420° C., whereas copper-based catalysts also enable the lower temperature range to be used, within the limits of the invention. It is also possible to vary this factor in order to modify the relative proportions of the final products. Thus, if it is desired to increase the relative amount of the 3-halogeno- and/or 3,5-dihalogenoaniline formed, relative to the 2,3,5-trihalogenoaniline, it is preferred to adopt a slightly higher temperature than in the case where this effect is not desired. The same shift can be found again when using a starting material which has a higher or lower degree of halogenation. Since the reaction is strongly exothermic, it is recommended to remove the heat in order to keep the reaction mixture at an essentially constant temperature; to do this, the conventional means are employed, such as cooling with the aid of heat-transfer fluids, or other means. In this respect, the application of the fluid-bed technique is of value because it avoids local overheating.

The amount of hydrogen to be employed in the process of the invention does not constitute a determining factor and can represent, as desired, the stoichiometric proportion, relative to the number of halogen atoms to be removed, or a small or large excess. The reaction takes place easily, is very rapid, at most of the order of a few seconds or even fractions of a second, and is perfectly suited at atmospheric pressure, although the application of a lower or higher pressure is obviously not excluded.

According to an optional but particularly advantageous characteristic of the process of the invention, the initial aromatic amines, containing several halogen atoms, can be prepared in situ by introducing, into the dehalogenation zone, the aromatic nitro compounds, containing several halogen atoms, which are used to obtain the said amines; the conversion of the nitro derivatives into anilines is very high or even quantitative. Thus, it is possible to manufacture the desired amines, containing relatively few halogen atoms, in a single stage directly from nitro compounds carrying a larger number of halogen atoms. An example of such a method of operation is, in particular, the manufacture of 3,5-dichloroaniline starting from 1-nitro-2,3,4,5-tetrachlorobenzene or from pentachloronitrobenzene, and the manufacture of 3-chloroaniline starting from 3,4-dichloroaniline or 3,4-dichloronitrobenzene.

In practice, a convenient means for carrying out the process according to the invention consists in introducing hydrogen and the halogen-containing starting material, which has been vaporised beforehand, through the bottom of a reaction zone which contains a catalyst bed consisting of support particles on which the catalyst is deposited, and which has been brought to the reaction temperature which is kept essentially constant. By suitably adjusting the rate of introduction of the gases, it is possible to keep the catalyst bed in the fluid state. Advantageously, the products formed are rapidly removed from the dehalogenation zone in order to avoid secondary reactions and degradation phenomena. At the outlet of the reactor, the gaseous effluent contains the hydrogen halide gas formed during the reaction, generally some hydrogen and some unconverted starting material, and the aromatic compounds resulting from the dehalogenation, the major proportion of which is represented by derivatives carrying a halogen in meta position whereas the remainder comprises various isomers and, possibly, a small proportion of a product containing no halogen atoms, and various impurities; these amines are at least partially present in the form of hydrogen halide salts. This mixture is treated by applying various techniques for the purpose of separating it into its constituents. An advantageous means consists in initially bringing the gaseous effluent, produced by the reaction, into contact with a liquid or vapour, such as an aliphatic alcohol like methanol, a hydrocarbon like benzene, or water, which is at a substantially lower temperature than the said effluent, for example at 100° C. or below, depending on the compound employed, in order to rapidly condense the anilines and/or their hydrogen halide salts. The various amino compounds are then separated, for example by crystallisation. The amines can be recovered in the free form, if necessary, by applying the conventional methods such as treatment with a basic compound like sodium hydroxide, potassium hydroxide, an alkali metal carbonate or the like. It is also possible firstly to liberate the amines and then to separate them by crystallisation or distillation. If water is used in this technique, additional advantage is taken of the fact that some hydrogen halide salts of amines are insoluble in an aqueous medium, whereas others are soluble. Thus, for example, tri- and tetrachloroaniline hydrochlorides are virtually insoluble, whereas mono- and di-chloroaniline hydrochlorides are soluble. An aqueous solution is then collected, in which the hydrogen halide gas and some hydrogen halide salts of anilines are dissolved and which contains the insoluble hydrogen halide salts in suspension or in the form of precipitates. Separation of the soluble products from the insoluble products is then achieved by means of a simple physical or mechanical operation such as filtration or centrifugation. The solid phase and the solution are then treated separately, as indicated above, in order to isolate the amino compounds.

If necessary, the initial unconverted amine or halogenoamines which have been produced by the reaction but were not particularly desired, for example derivatives containing three halogen atoms in the case of a process intended for manufacturing essentially derivatives containing two halogen atoms, can advantageously be recycled, in whole or in part, into the reaction zone where they are resubjected to the dehalogenation process according to the invention. They can be recycled either with the hydrogen halide salts or with the free amines.

It is clear that the scope of the invention is not exceeded by adopting a practical method for carrying out the process, which is different from that explained above, or to treat the effluent, produced by the dehalogenation, by any means other than those which have been described above by way of indication.

The following examples, which are given without implying a limitation, reveal the performance and advantages of the process according to the present invention.

The abbreviations used in these examples are:
TTCNB: tetrachloronitrobenzene
TTCA: tetrachloroaniline
TCA: trchloroaniline
DCA: dichloroaniline
CA: chloroaniline
A: aniline
C: equivalent of TTCNB pyrolysed to "carbon".

EXAMPLE 1

A tubular reactor is used which is filled with 100 g of catalyst grains (size: 20 to 100 microns) in a fluid bed.

The catalyst is prepared by impregnating an alumina, having a specific surface area of about 300 m$^2$/g, in a coating kettle using a volume of aqueous solution which approximately represents the porous volume and contains, per 100 g of finished catalyst, 6 g of copper in the form of copper chloride (CuCl$_2$.2H$_2$O) and 0.5 g, respectively, of rhodium trichloride (RhCl$_3$.4H$_2$O), iridium in the form of chloroiridic acid (H$_2$IrCl$_6$), ruthenium in the form of ruthenium trichloride (RuCl$_3$), palladium in the form of palladium chloride (PdCl$_2$) or Pd(NO$_3$)$_2$, or platinum in the form of platinous chloride (PtCl$_4$) or platinic chloride (PtCl$_6$.6H$_2$O).

Another catalyst, with copper/palladium on alumina of 80 m$^2$/g, is also used. After impregnation, each of the catalysts is dried at a temperature of between 150° and 180° C.

62 g of vaporised 2,3,4,5-tetrachloronitrobenzene and 75 liters of hydrogen, that is to say a molar ratio of hydrogen/tetrachlorobenzene of 14/1, are introduced into the reactor per hour.

The temperature in the reactor is of the order of 310° C. and is kept essentially constant by cooling with a heat-transfer fluid.

The contact time of the mixture of gases with the catalyst is 3 seconds and the whole reaction lasts 4 hours. From the top of the dehalogenation zone, the reaction effluent passes into a column for washing with water. The latter carries down the anilines and the HCl, whereas the excess hydrogen is discarded into the atmosphere.

The mixture recovered at the bottom of the washing column is then neutralised with sodium hydroxide in order to liberate the organic part which is analysed by vapour phase chromatography and thin layer chromatography.

In this table, the yields are expressed in mol % relative to the number of mols of TTCNB introduced, after series of 4-hour experiments. The yield of carbon (C) is expressed in mol % of TTCNB pyrolysed on the catalyst, and was obtained from the determination of deposited carbon, the value of which is given on the last line, expressed in % by weight of catalyst after the experiment.

By way of comparison, the results are given for an operation carried out under the same conditions with a catalyst containing only 6% of copper, as described in French Application No. 2,162,782.

The table (following page) clearly shows:
the significant decrease, of the order of 50%, in the levels of carbon deposited on the catalyst, when using mixed catalysts according to the invention and, a substantial increase in the proportion of compounds carrying chlorine atoms in the meta position on the nucleus and, in particular, an increase of 50% for 3,5-dichloroaniline and 250 to 450% for 3-chloroaniline.

| Effluents | Conventional catalyst (Cu by itself) | Catalyst according to the invention: Cu+ | | | | | |
|---|---|---|---|---|---|---|---|
| | | +Pd (1) | +Pd (2) | +Pt (2) | +Rh (2) | +Ir (2) | +Ru (2) |
| 2,3,4,5-TTCNB | 0.3 | — | — | — | <0.05 | — | 0.05 |
| 2,3,4,5-TTCA | 8.2 | 5.2 | 4.5 | 3.4 | 4.5 | 4.7 | 6.0 |
| 3,4,5-TCA | 1.0 | — | — | — | — | 0.5 | 0.5 |
| 2,3,5-TCA | 30.4 | 23.1 | 19.3 | 15.8 | 21.5 | 21.0 | 21.0 |
| 3,5-DCA | 37.3 | 45.3 | 55.4 | 52.3 | 56.8 | 56.1 | 55.7 |
| 2,5-DCA | 2.2 | 2.6 | 1.3 | 1.4 | 1.0 | 1.2 | 1.1 |
| 3-CA | 2.7 | 9.5 | 9.2 | 12.5 | 7.2 | 7.8 | 6.6 |
| A | | 8.7 | 0.3 | 0.4 | 0.2 | 0.3 | 0.3 |
| C | 17.1 | 5.1 | 9.6 | 13.6 | 8.5 | 8.2 | 8.5 |
| Carbon on catalyst (%) | 8.0 | 2.6 | 4.4 | 5.6 | 4.1 | 3.9 | 4.2 |

(1):alumina support of 80 m$^2$/g
(2):alumina support of 300 m$^2$/g

EXAMPLE 2

The procedure of the preceding example is followed, except that equal volumes of vaporised 3,4-dichloroaniline and of hydrogen, in a molar ratio of H$_2$/3,4-DCA of about 5, are introduced into the reactor. The reaction is carried out for 3 hours at 320° C. with a residence time of 3 seconds.

Under these conditions, the results are recorded in the following table, again expressed as a molar percentage:

| Effluents | mol % |
|---|---|
| 3,4-DCA | 1.4 |
| 3,5-DCA | 0.49 |
| 3-CA | 89.32 |
| A | 8.7 |
| % on the catalyst | 3.83 |

This table clearly shows the value of the process which enables a virtually complete conversion of 3,4-dichloraniline into 3-chloroaniline.

EXAMPLE 3

The procedure of Example 1 is followed, using, on the one hand, the same catalyst containing 6% of copper and 0.5% by weight of palladium as the active phase, and, on the other hand, another catalyst which has the same active phase but in which the support consists of the same alumina (300 m$^2$/g) as previously, except that the alumina was impregnated beforehand using an aqueous solution of chromium oxide, so as to obtain a final chromium content of 10%. The impregnated support was then calcined at 950° C. for 3 hours.

The table below indicates the yields, expressed as a molar percentage, relative to the initial 2,3,4,5-tetrachloronitrobenzene, with the catalyst illustrated in Example 1 and the catalyst having a modified support.

| Type of catalyst | On unmodified support | On modified support |
|---|---|---|
| Support | Alumina 300 m²/g | Al$_2$O$_3$ 300 m²/g + Cr$_2$O$_3$ (10% Cr) |
| Active phase | 6% Cu + | 0.5% Pd |
| 2,3,4,5-TTCNB | 0.0 | 0.0 |
| 2,3,4,5-TTCA | 4.0 | 9.9 |
| 3,4,5-TCA | | 1.0 |
| 2,3,4-TCA | | 0.4 |
| 2,3,5-TCA | 19.8 | 27.6 |
| 3,5-DCA | 55.8 | 39.9 |
| 2,5-DCA | 1.2 | 2.7 |
| 3-CA | 8.6 | 9.9 |
| A | 0.3 | 1.4 |
| "Pyrolised" TTCNB | 9.9 | 5.4 |
| C% on catalyst | 4.5 | 3.1 |

This table shows that modification of the support, as described above, further decreases the level of carbon on the catalyst, which significantly increases the lifetime, whilst retaining an acceptable selectivity with respect to 3,5-dichloroaniline.

We claim:

1. Process for the dehalogenation of halogen-containing aromatic amines, which leads to the preferential production of derivatives carrying a smaller number of halogen atoms, at least one of which is located in the meta position, relative to the amino group, in the vapour phase, by the action of hydrogen in the presence of a controlled-action hydrogenation catalyst, at a temperature of between 280° and 420° C., wherein the active phase of the catalyst contains, in addition to the main catalyst metal, a minor amount of an auxiliary hydrogenation catalyst consisting of a Group VIII metal which is different from the first.

2. Process according to claim 1, wherein the auxiliary catalyst is a metal chosen from the group consisting of ruthenium, rhodium and palladium.

3. Process according to claim 1, wherein the auxiliary catalyst is a metal chosen from the group consisting of iridium and platinum.

4. Process according to one of claims 1 or 4, wherein the amount of metal in the auxiliary catalyst represents about 0.01 to 2% by weight of the whole catalyst.

5. Process according to claim 1, wherein the active phase of the main catalyst is copper.

6. Process according to claim 1, wherein the active phase of the main catalyst is silver.

7. Process according to claim 1, wherein the total amount of metal carried on the support represents from 1 to 20% by weight of the support.

8. Process according to claim 1, wherein the support is an alumina.

9. Process according to claim 8, wherein the support is an alumina which has been modified by the incorporation of a metal, followed by a calcination at a temperature of 500° to 1,000° C.

10. Process according to claim 9, wherein the metal is incorporated by impregnating the alumina using a salt or oxide of this metal.

11. Process according to claim 10, wherein the metal is incorporated by mixing an aluminium salt with a metal salt, shaping the mixture, gelling it by neutralising the resulting compound and dispersing it as fine spherical droplets in a hot hydrocarbon.

12. Process according to claim 1, wherein the support is a silica.

13. Process according to claim 1, wherein the initial amine contains two, three or four halogen atoms on a phenyl nucleus.

14. Process according to claim 13, wherein the halogen atoms are chlorine atoms.

15. Process according to claim 1, wherein the initial aromatic amines, containing several halogen atoms, are prepared in situ by introducing, into the dehalogenation zone, the aromatic nitro compounds, containing several halogen atoms, which are used to obtain the said amines.

16. Process according to claim 1, wherein the initial unconverted amine or halogenoamines produced by the reaction are recycled, in whole or in part, into the reaction zone.

17. Process according to claim 1, wherein the gaseous effluent produced by the reaction is brought into contact with a liquid or vapour which is at a substantially lower temperature than the said effluent.

18. Process according to claim 17, wherein the liquid or vapour is water.

* * * * *